US012722484B2

(12) United States Patent
Dickinson

(10) Patent No.: US 12,722,484 B2
(45) Date of Patent: Sep. 1, 2026

(54) PROJECTION DEVICE

(71) Applicant: Lorne Dickinson, Traverse City, MI (US)

(72) Inventor: Lorne Dickinson, Traverse City, MI (US)

(*) Notice: Subject to any disclaimer, the term of this patent is extended or adjusted under 35 U.S.C. 154(b) by 0 days.

(21) Appl. No.: 19/039,979

(22) Filed: Jan. 29, 2025

(65) Prior Publication Data

US 2026/0217112 A1 Jul. 30, 2026

(51) Int. Cl.
*B60K 35/231* (2024.01)
*H04N 9/31* (2006.01)

(52) U.S. Cl.
CPC ......... *B60K 35/231* (2024.01); *H04N 9/3147* (2013.01); *B60K 2360/166* (2024.01); *B60K 2360/816* (2024.01)

(58) Field of Classification Search
CPC ............ B60K 35/231; B60K 2360/166; B60K 2360/816; H04N 9/3147
USPC .......................................... 348/744; 345/7, 8
See application file for complete search history.

(56) References Cited

U.S. PATENT DOCUMENTS 3,317,906 A 5/1967 Baldridge
5,469,184 A 11/1995 Mount
7,187,270 B2 3/2007 Kushida
8,629,903 B2 1/2014 Seder
D846,465 S 4/2019 Zhao
10,994,613 B2 5/2021 Hirata
11,526,005 B2 12/2022 Choi
2011/0230165 A1* 9/2011 Kleve .................. H04W 4/029 455/411
2015/0362731 A1* 12/2015 Hack ...................... B60K 35/22 359/632
2016/0025973 A1* 1/2016 Guttag ................... B60K 35/10 345/7
2016/0282620 A1* 9/2016 Park ....................... B60K 35/22
2019/0219823 A1* 7/2019 Henon ................. B60K 35/231
2022/0219691 A1* 7/2022 Maleki ............... B60W 30/143

FOREIGN PATENT DOCUMENTS

EP 2728395 A1 * 5/2014 ......... G02B 27/0101
WO WO2019053987 3/2019

* cited by examiner

*Primary Examiner* — John W Miller
*Assistant Examiner* — Omer Khalid

(57) ABSTRACT

A projection device for displaying data about local driving conditions for a driver includes a vehicle having a dashboard and a windshield. A housing is positionable on the dashboard. A panel is pivotable toward and away from the housing and is positionable to face the windshield. A transceiver wirelessly communicates with a global positioning system to identify a geographic location of the housing and to receive a plurality of data points for the geographic location. A plurality of projectors are positioned on the panel. Each projector projects a respective data point of the plurality of data points onto the windshield wherein the plurality of data points are visible to a user while the user is driving the vehicle.

15 Claims, 8 Drawing Sheets

PROJECTION DEVICE

CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to projectors and more particularly pertains to a new projector for displaying data about local driving conditions for a driver.

(2) Description of Related Art Including Information Disclosed Under 37 CFR 1.97 and 1.98

The prior art relates to projectors. Projectors are a common tool that direct light beams at a surface to display images, words, or other information. In recent years, projectors have become a popular addition to vehicles, for example used to create heads-up display systems that project the speed of the vehicle onto the windshield, within the line of sight of the driver. Such heads-up displays are very popular, because they allow the driver to closely watch the speed at which they are driving without looking away from the road to check the speedometer. However, heads-up displays are integrated into vehicles when the vehicles are built. Additionally, the heads-up displays provide information about the vehicle itself, but do not provide information about local driving conditions, such as the local speed limit or local weather information. Thus, there is a need for a projection device that can be retrofitted onto an existing vehicle. Ideally, such a device would provide information about local driving conditions, for example to help alert the driver to potentially unsafe weather conditions.

BRIEF SUMMARY OF THE INVENTION

An embodiment of the disclosure meets the needs presented above by generally comprising a vehicle having a dashboard and a windshield. A housing is positionable on an exterior surface of the dashboard. A panel is pivotably coupled to the housing wherein the panel is pivotable toward and away from the housing. The panel has an upper surface that is positionable to face the windshield when the panel is pivoted away from the housing. A transceiver is positioned within the housing. The transceiver is configured to wirelessly communicate with a global positioning system wherein the transceiver is configured to identify a geographic location of the housing and wherein the transceiver is configured to receive a plurality of data points for the geographic location. A processor is electrically coupled to the transceiver. A plurality of projectors is electrically coupled to the processor. The plurality of projectors are positioned on the upper surface of the panel wherein each projector of the plurality of projectors is configured to project a respective data point of the plurality of data points for the geographic location onto the windshield while the housing is positioned on the dashboard and while the panel is pivoted away from the housing and wherein the plurality of data points for the geographic location are configured to be visible to a user while the user is driving the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
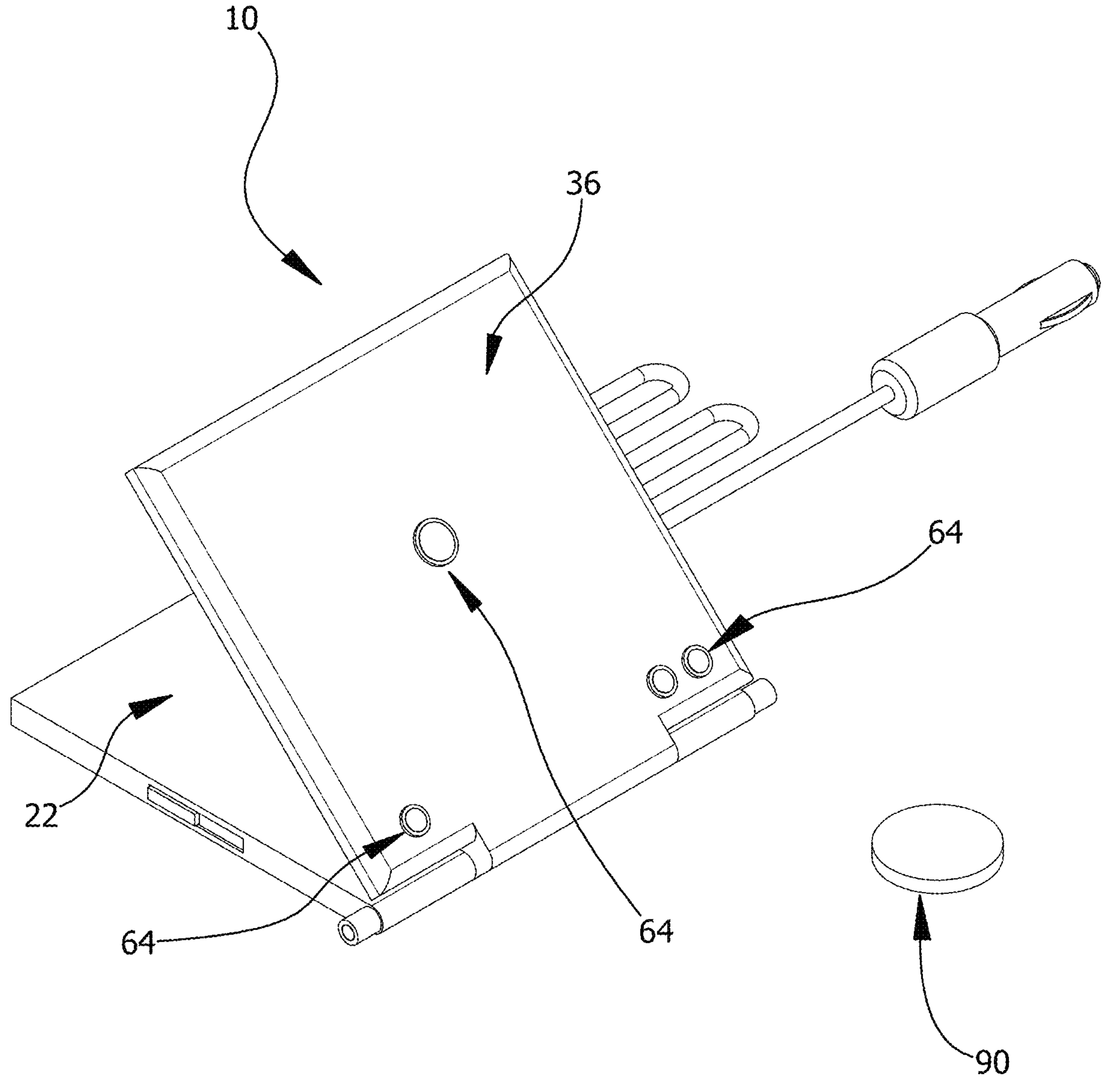
FIG. 1 is a top front isometric view of a projection device according to an embodiment of the disclosure.

With reference now to the drawings, and in particular to FIGS. 1 through 8 thereof, a new projector embodying the principles and concepts of an embodiment of the disclosure and generally designated by the reference numeral 10 will be described.

As best illustrated in FIGS. 1 through 8, the projection device 10 generally comprises a vehicle 12. Typically, the vehicle 12 includes a dashboard 14, a windshield 16, and an interior space 18. The windshield 16 is generally positioned adjacent to the dashboard 14. The windshield 16 may have a windshield interior surface 20 that is positioned within the interior space 18 wherein the windshield interior surface 20 is configured to be visible to a user while the user is driving the vehicle 12.

A housing 22 generally includes a bottom wall 24, a top wall 26, and a peripheral wall 28 that is coupled to and extends between the bottom wall 24 and the top wall 26. The bottom wall 24 may be planar wherein the bottom wall 24 is removably positionable on an exterior surface 106 of the dashboard 14. In other words, the housing 22 is extrinsic to the dashboard 14 and the vehicle 12 wherein the housing 22 is not an integral part of the dashboard 14 or the vehicle 12, and wherein the housing 22 does not need to be installed during the initial manufacture of the vehicle 12. The top wall 26 of the housing 22 may be planar. The peripheral wall 28 generally has a front side 30, a back side 32, and a pair of lateral sides 34.

A panel 36 is pivotably coupled to the housing 22. The panel 36 is generally pivotable toward and away from the top wall 26 of the housing 22. The panel 36 may have a lower surface 38 and an upper surface 40. The lower surface 38 generally faces the top wall 26 of the housing 22. The lower surface 38 may be planar wherein the lower surface 38 is positionable flush against the top wall 26 of the housing 22 when the panel 36 is fully pivoted toward the top wall 26 of the housing 22. The upper surface 40 is positionable to face the windshield interior surface 20 of the windshield 16 when the panel 36 is pivoted away from the top wall 26 of the housing 22. The panel 36 may have a lower edge 42 that is positioned proximate to a junction between the panel 36 and the housing 22 wherein the panel 36 is pivotable about the lower edge 42.

A transceiver 44 may be positioned within the housing 22. The transceiver 44 is generally configured to wirelessly communicate with a global positioning system 46 wherein the transceiver 44 is configured to identify a geographic location of the housing 22. The transceiver 44 is also configured to receive a plurality of data points 48 for the geographic location. For example, the plurality of data points 48 may include a local speed limit 50, a local wind speed 52, a local wind gust speed 54, a local wind direction 56, and a local temperature 58. For example, the global positioning system 46 may provide the plurality of data points 48 to the transceiver 44 based on the geographic location of the housing 22, similar to the way that a maps application on a cellular telephone can provide the user with information about the speed limits and driving conditions in the area where the user is driving.

A processor 60 may be positioned within the housing 22. The processor 60 is electrically coupled to the transceiver 44. A power source 62 may be positioned within the housing 22. The power source 62 is electrically coupled to the processor 60.

A plurality of projectors 64 are electrically coupled to the processor 60. The plurality of projectors 64 may be inset into the upper surface 40 of the panel 36. The plurality of projectors 64 may be exposed within the upper surface 40 of the panel 36. Each projector of the plurality of projectors 64 is generally configured to project a respective data point of the plurality of data points 48 for the geographic location onto the windshield interior surface 20 of the windshield 16 while the bottom wall 24 of the housing 22 is positioned on the dashboard 14 and while the panel 36 is pivoted away from the top wall 26 of the housing 22. The plurality of data points 48 are generally configured to be positioned on the windshield interior surface 20 within a line of sight of the user, such that the user can see each data point of the plurality of data points 48 while the user is driving the vehicle 12.

For example, the plurality of projectors 64 may include a speed projector 66. The speed projector 66 may be centered on the upper surface 40 of the panel 36. The speed projector 66 is generally configured to project the local speed limit 50 onto the windshield interior surface 20 wherein the local speed limit 50 is configured to be visible to the user while the user is driving the vehicle 12.

A wind data projector 68 may be positioned proximate to the lower edge 42 of the panel 36. The wind data projector 68 is generally configured to project the local wind speed 52 and the local wind gust speed 54 onto the windshield interior surface 20 wherein each of the local wind speed 52 and the local wind gust speed 54 is configured to be visible to the user while the user is driving the vehicle 12.

A wind direction projector 70 may be positioned adjacent to the wind data projector 68. The wind direction projector 70 is generally configured to project the local wind direction 56 onto the windshield interior surface 20 wherein the local wind direction 56 is configured to be visible to the user while the user is driving the vehicle 12.

A temperature projector 72 may be spaced from the wind direction projector 70. For example, the temperature projector 72 may be positioned proximate to the lower edge 42 of the panel 36. The temperature projector 72 is generally configured to project the local temperature 58 onto the windshield interior surface 20 wherein the local temperature 58 is configured to be visible to the user while the user is driving the vehicle 12.

A power switch 74 may be electrically coupled to the processor 60. The power switch 74 is actuatable to signal the processor 60 to actuate the plurality of projectors 64. The power switch 74 may be positioned on a first lateral side of the pair of lateral sides 34 of the peripheral wall 28 of the housing 22. A power cord 76 may be electrically coupled to the power source 62. The power cord 76 is configured to be removably positionable within an external power outlet to transfer power to the power source 62. For example, the external power outlet may be positioned on the dashboard 14 and electrically coupled to a car battery of the vehicle 12, wherein the power cord 76 is configured to transfer power from the car battery to the power source 62 within the housing 22. The power cord 76 may extend outwardly from a second lateral side of the pair of lateral sides 34 of the peripheral wall 28 of the housing 22.

A cutout 78 may extend into the housing 22. For example, the cutout 78 may be positioned on the back side 32 of the peripheral wall 28 of the housing 22. A fin 80 may be coupled to the panel 36. For example, the fin 80 may extend from the lower edge 42 of the panel 36. The fin 80 generally has a shape that is complementary to a shape of the cutout 78 wherein the fin 80 is positioned within the cutout 78.

A channel 82 may extend through the back side 32 of the peripheral wall 28 of the housing 22 and the fin 80. A rod 84 may be positioned within the channel 82. The rod 84 may be pivotably coupled to the housing 22 within the channel 82. The rod 84 may be statically coupled to the fin 80 wherein the rod 84 pivots the fin 80 and the panel 36 when the rod 84 is pivoted within the channel 82. The rod 84 may have a pair of opposing ends 86. For example, the rod 84 may have a length exceeding a length of the channel 82 wherein each opposing end of the pair of opposing ends 86 of the rod 84 is exposed adjacent to a respective lateral side of the pair of lateral sides 34 of the housing 22.

A pair of end caps 88 may be coupled to the rod 84. Each end cap of the pair of end caps 88 is generally positioned on a respective opposing end of the pair of opposing ends 86 of the rod 84. Each end cap of the pair of end caps 88 may comprise a high friction material wherein the pair of end caps 88 are configured to inhibit the rod 84 from being pivoted within the channel 82 until pressure is applied to one of the rod 84 and the panel 36. For example, the high friction material may comprise rubber that secures a position of the rod 84 within the channel 82 until upward or downward pressure is applied to the panel 36 to pivot the panel 36 toward or away from the housing 22, or until rotational pressure is applied to one end of the pair of opposing ends 86 of the rod 84 to rotate the rod 84 within the channel 82. The rod 84 and the pair of end caps 88 thereby releasably secure a position of the panel 36 relative to the housing 22.

A coupler 90 may releasably couple the housing 22 to the dashboard 14 of the vehicle 12. For example, the coupler 90 may include a first mating member 92 that is coupled to the bottom wall 24 of the housing 22. The first mating member 92 may be centered on the bottom wall 24 of the housing 22. The first mating member 92 may be magnetic. A second mating member 96 may be couplable to the dashboard 14. The second mating member 96 may also be magnetic wherein the second mating member 96 is magnetically attracted to the first mating member 92 to releasably secure the housing 22 on the dashboard 14.

Figure 2:
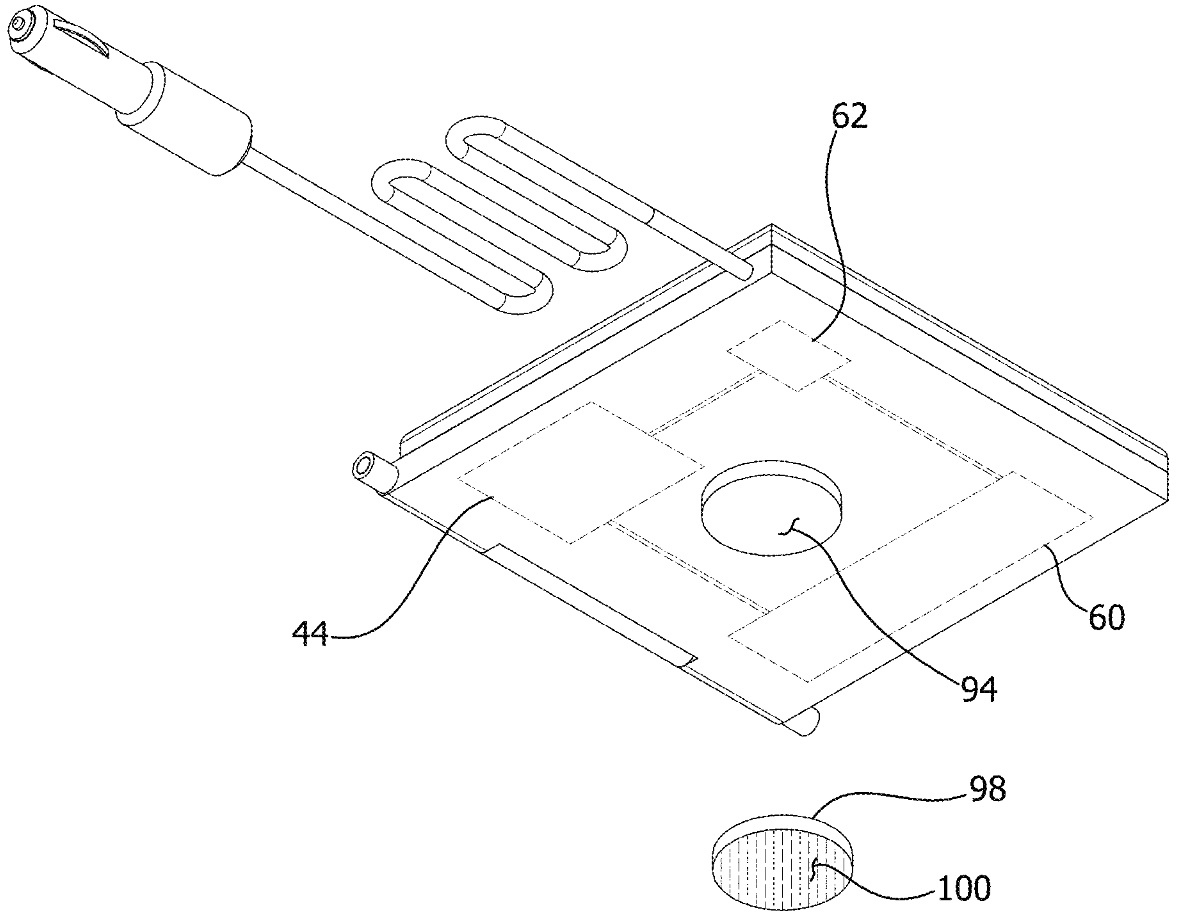
FIG. 2 is a bottom rear isometric view of an embodiment of the disclosure.
Figure 3:
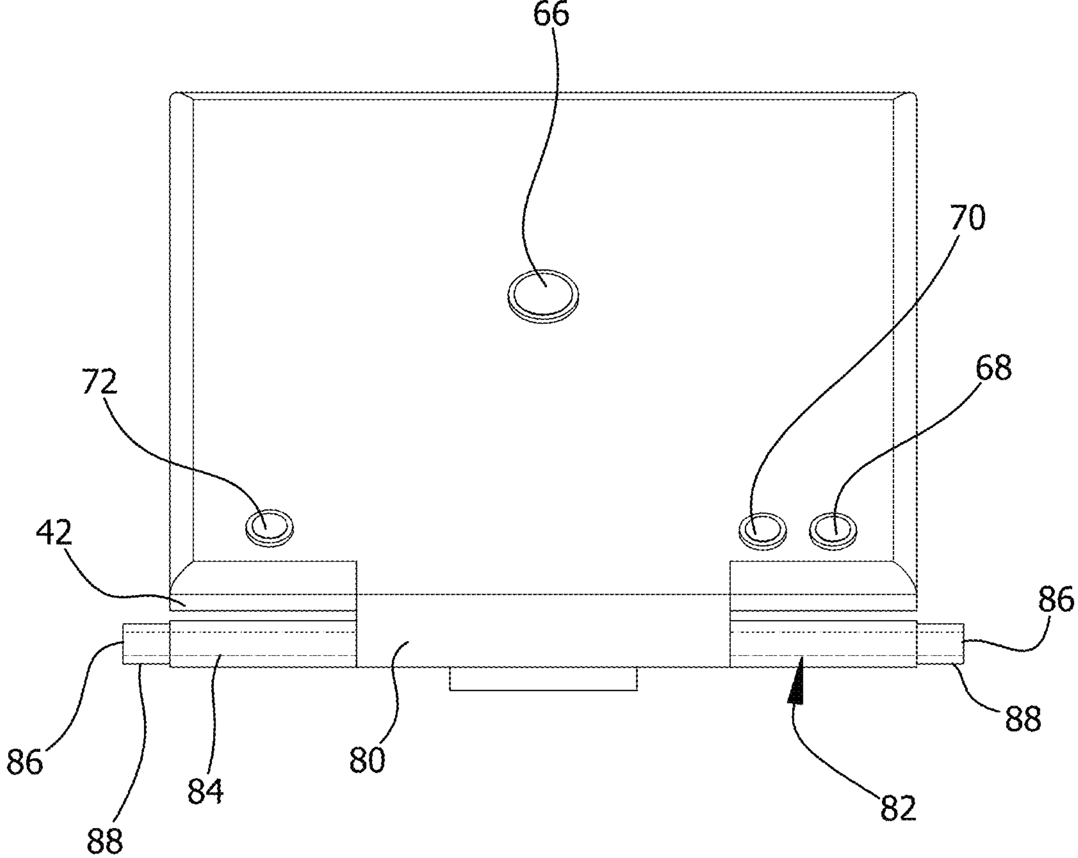
FIG. 3 is a front view of an embodiment of the disclosure.
Figure 4:
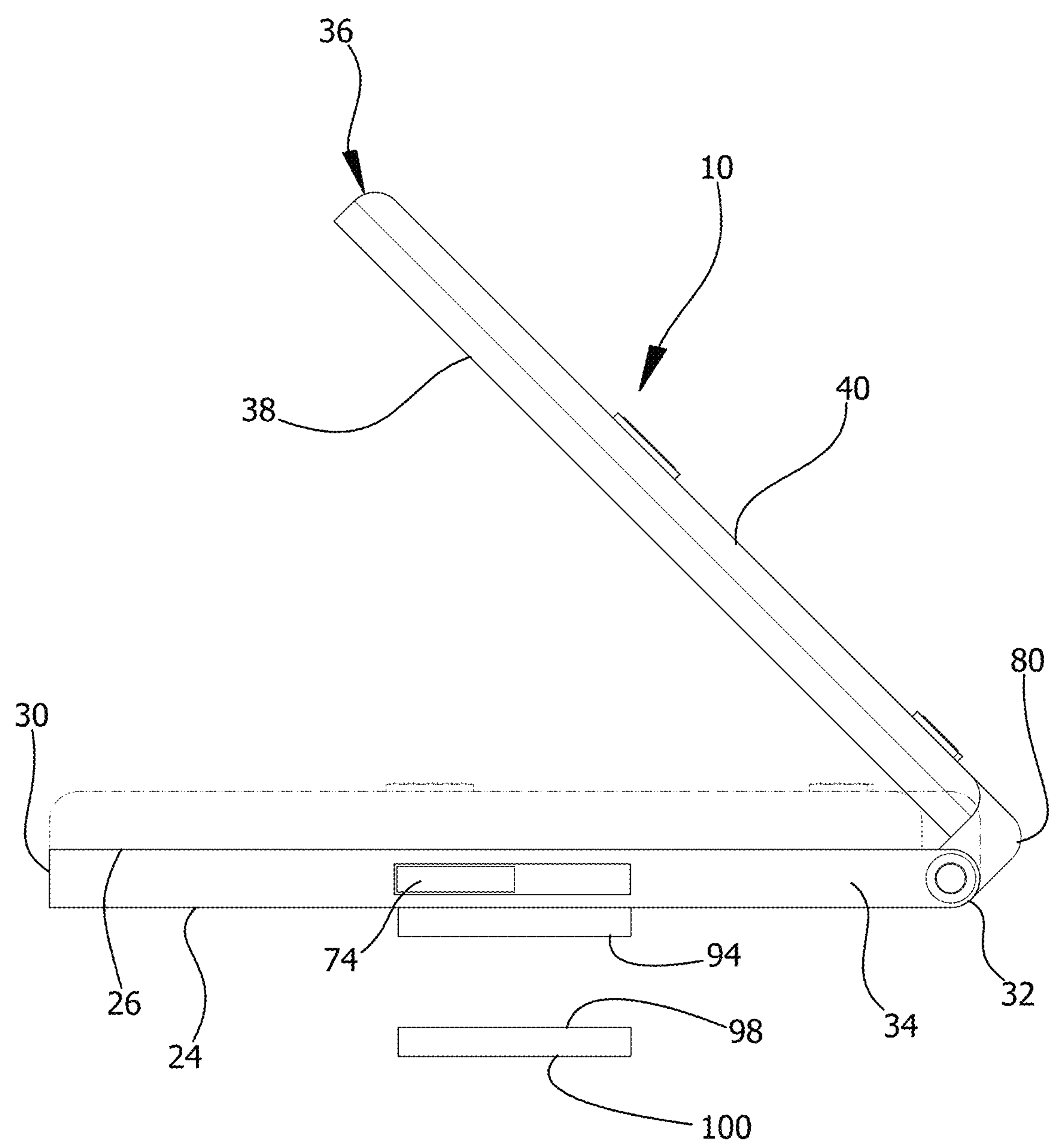
FIG. 4 is a side view of an embodiment of the disclosure.
Figure 5:
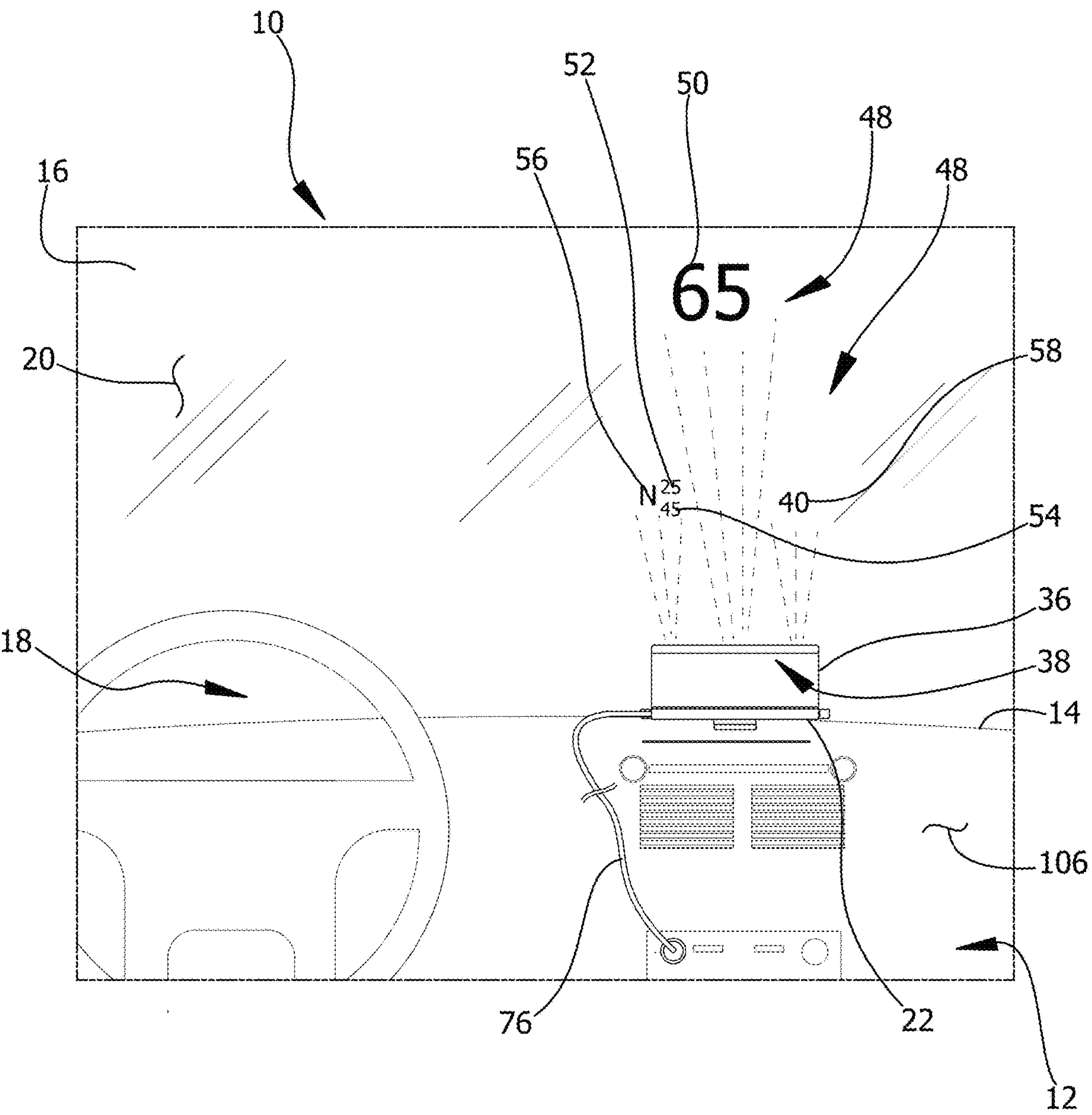
FIG. 5 is an in-use view of an embodiment of the disclosure.
Figure 6:
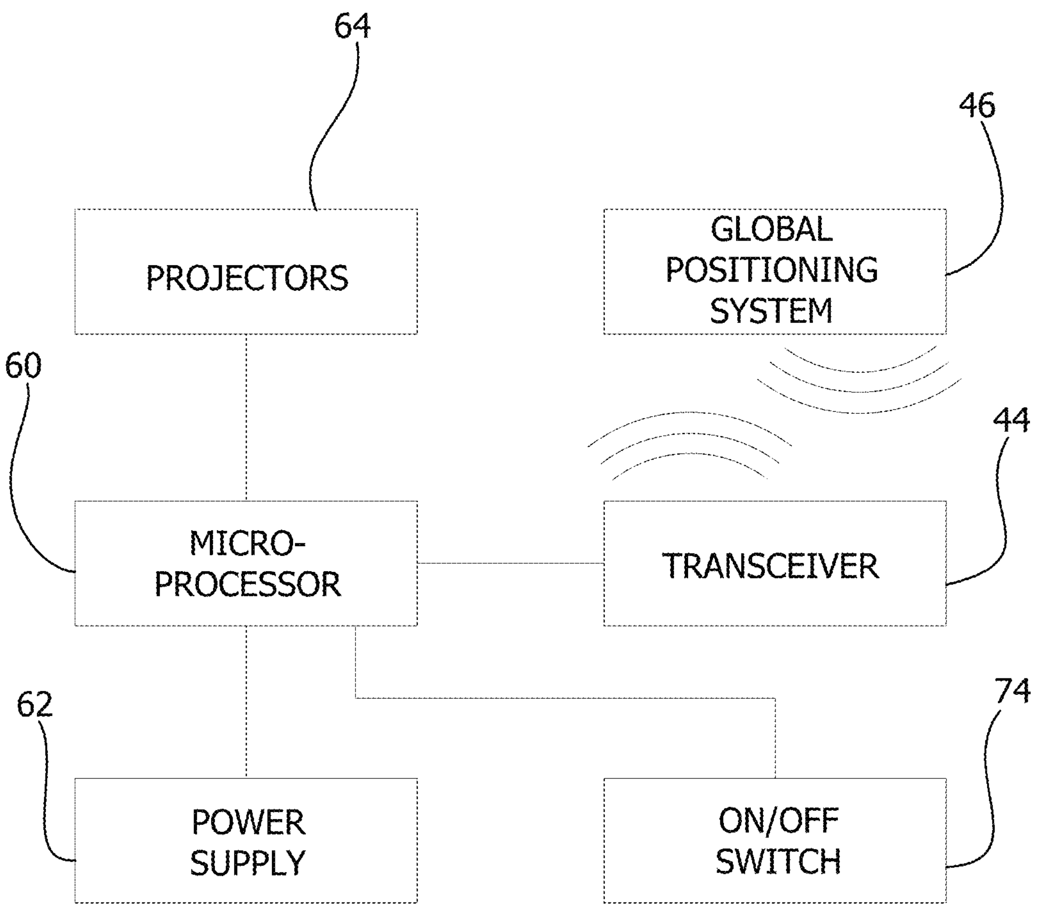
FIG. 6 is a block diagram view of an embodiment of the disclosure.

As shown in FIG. 2, the first mating member 92 may be generally planar. In other words, the first mating member 92 may generally have a first mating member outer surface 94 that faces outwardly from the housing 22, and the first mating member outer surface 94 may be planar. In such embodiments, the second mating member 96 may include a second mating member upper surface 98 that is planar wherein the second mating member upper surface 98 is positionable flush against the first mating member outer surface 94 of the first mating member 92. The second mating member 96 may also have a second mating member lower surface 100 that is adhesive. The second mating member lower surface 100 may adhesively engage the dashboard 14 to secure the second mating member 96 on the dashboard 14.

Figure 7:
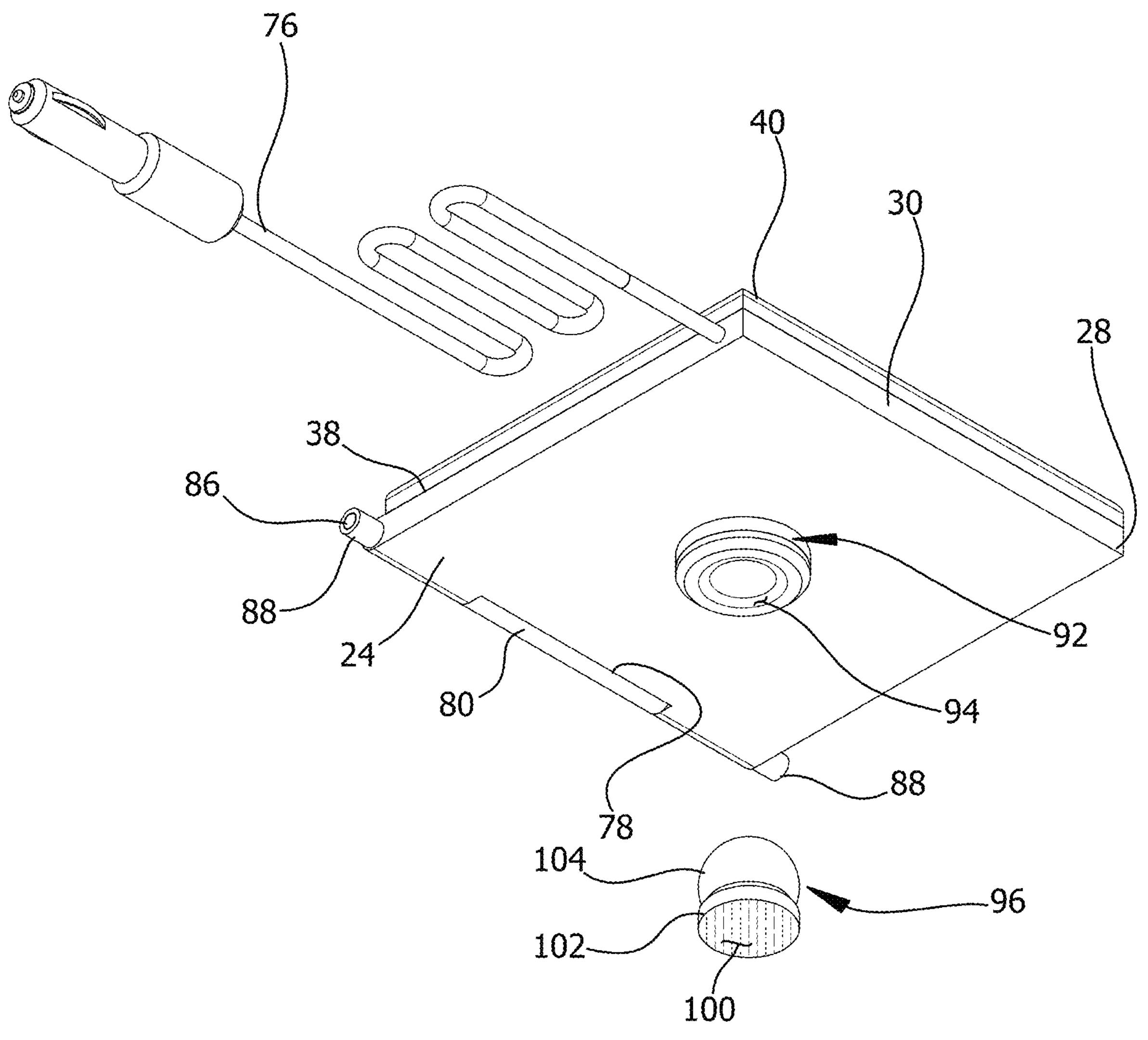
FIG. 7 is a bottom rear isometric view of an embodiment of the disclosure.
Figure 8:
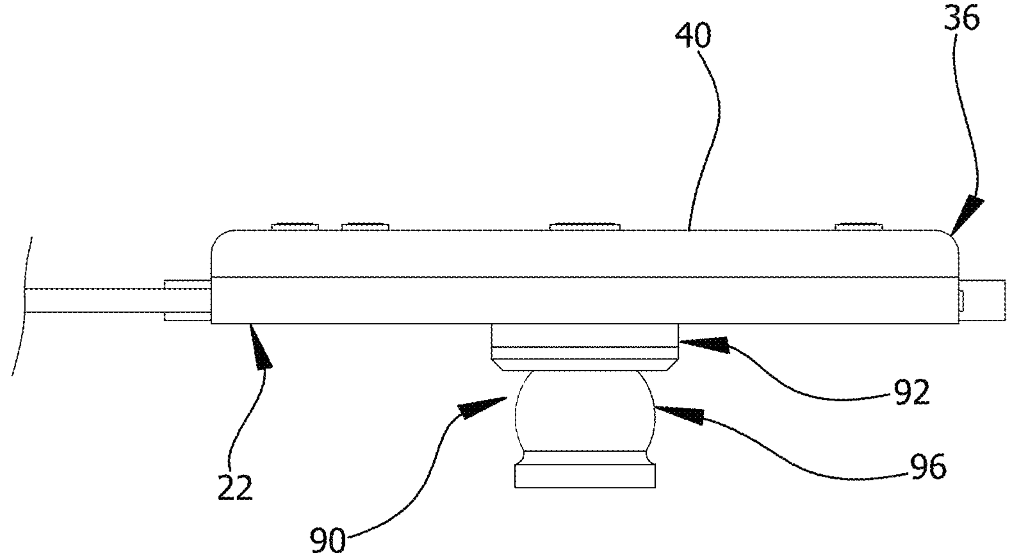
FIG. 8 is a side view of an embodiment of the disclosure.

As shown in FIG. 7, the first mating member outer surface 94 may be concavely arcuate. In such embodiments, the second mating member 96 may include a second mating member plate 102. The second mating member plate 102 may have the second mating member lower surface 100. As with the embodiment in FIG. 2, the second mating member lower surface 100 may be adhesive wherein the second mating member lower surface 100 adhesively engages the dashboard 14 to secure the second mating member 96 on the dashboard 14. A second mating member dome 104 may be coupled to the second mating member plate 102. The second mating member dome 104 generally extends from the second mating member plate 102. The second mating member dome 104 may be convexly arcuate wherein the second mating member dome 104 has a curvature that is complementary to a curvature of the first mating member outer surface 94. The first mating member outer surface 94 may be pivotable on the second mating member dome 104 while the first mating member 92 is coupled to the second mating member 96 whereby the coupler 90 facilitates the housing 22 in being pivoted on the dashboard 14.

In use, the housing 22 can be placed on the dashboard 14, and the panel 36 can be pivoted away from the housing 22. The power switch 74 can be actuated to signal the processor 60 to actuate the plurality of projectors 64, which will display the plurality of data points 48 for the geographic location identified by the wireless communication between the transceiver 44 and the global positioning system 46. For example, if the local speed limit 50 is 65 miles per hour, the speed projector 66 will display the number "65" on the windshield interior surface 20 of the windshield 16, within the line of sight of the driver. The driver can thus continuously see the speed limit for the road on which the driver is driving the vehicle 12 and can adjust the speed of the vehicle 12 accordingly.

Having the plurality of data points 48 about the geographic location of the housing 22, and thus the vehicle 12, may be particularly helpful when the user is a professional driver. For example, a long-haul or over-the-road truck driver may receive bonus pay for staying within the speed limit for the entire trip. With the projection device 10, the truck driver can be constantly aware of the local speed limit 50, helping them to obtain that bonus pay. Additionally, the wind can pose a significant safety issue for semi-trucks and other large vehicle 12*s*. The user may thus want to adjust their driving techniques, or stop driving to wait out bad weather, based on the local wind speed 52, the local wind gust speed 54, or the local wind direction 56. The performance of the vehicle 12 may also be affected by the local temperature 58, particularly when the local temperature 58 is extremely high. The projection device 10 allows the user to be aware of those weather conditions, helping the user to drive more safely and efficiently.

The color of the plurality of projections may be red, green, blue, or another color that is highly visible to the user against the windshield 16. for example, in certain embodiments, the color of the plurality of projections may be adjustable to accommodate individuals with color blindness or difficulty seeing certain wavelengths of colors. Additionally, the color of the plurality of projections may change in certain scenarios. For example, when the local temperature 58 approaches 34-32 degrees Fahrenheit, the display color of the temperature projector 72 may change from red to blue, to indicate the freezing cold temperatures. Similarly, the display color for the wind data projector 68 may change to red when the local wind speed 52 or local wind gust speed 54 exceeds 25 mph, to indicate the dangerously high wind speeds. The size of each projection of the plurality of projections may also be adjustable, for example by adjusting a distance between the housing 22 and the windshield 16, or by pivoting the housing 22 on the dashboard 14 to adjust an angle between the panel 36 and the windshield 16.

In certain embodiments, the transceiver 44 may wirelessly communicate with an external electronic device that has a user interface or application configured to facilitate adjustment of the display settings for the plurality of projections (e.g., size, color, opacity). The external electronic device could be a cellular telephone, or it could be a remote-type device. In a third example, a control panel 36 may be electrically coupled to the processor 60 and the control panel 36 may include a plurality of buttons configured to facilitate adjustment of the display settings for the plurality of projections.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A projection system comprising:

a vehicle having a dashboard and a windshield;

a housing being positionable on an exterior surface of the dashboard;

a panel being pivotably coupled to the housing wherein the panel is pivotable toward and away from the housing, the panel having an upper surface being positionable to face the windshield when the panel is pivoted away from the housing;

a transceiver being positioned within the housing, the transceiver being configured to wirelessly communicate with a global positioning system wherein the transceiver is configured to identify a geographic location of the housing and wherein the transceiver is configured to receive a plurality of data points for the geographic location;

a processor being electrically coupled to the transceiver;

a plurality of projectors being electrically coupled to the processor, the plurality of projectors being positioned on the upper surface of the panel wherein each projector of the plurality of projectors is configured to project a respective data point of the plurality of data points for the geographic location onto the windshield while the housing is positioned on the dashboard and while the panel is pivoted away from the housing and wherein the plurality of data points for the geographic location are configured to be visible to a user while the user is driving the vehicle;

a cutout extending into the housing;

a fin being coupled to the panel, the fin extending from the panel, the fin having a shape being complementary to a shape of the cutout wherein the fin is positioned within the cutout;

a channel extending through the back side of the peripheral wall of the housing and the fin; and a rod being positioned within the channel, the rod being pivotably coupled to the housing within the channel, the rod being statically coupled to the fin wherein the rod pivots the fin and the panel when the rod is pivoted within the channel.

2. The projection system of claim 1, further comprising a power source being positioned within the housing, the power source being electrically coupled to the processor.

3. The projection system of claim 1, the plurality of data points for the geographic location further comprising a local speed limit, a local wind speed, a local wind gust speed, a local wind direction, and a local temperature.

4. The projection system of claim 3, the plurality of projectors further comprising:

a speed projector being configured to project the local speed limit onto the windshield;

a wind data projector being configured to project the local wind speed and the local wind gust speed onto the windshield;

a wind direction projector being configured to project the local wind direction onto the windshield; and a temperature projector being configured to project the local temperature onto the windshield.

5. The projection system of claim 1, further comprising a power switch being electrically coupled to the processor, the power switch being actuatable to signal the processor to actuate the plurality of projectors.

6. The projection system of claim 5, wherein the power switch is positioned on a lateral side of the housing.

7. The projection system of claim 1, the rod further comprising a pair of opposing ends, the rod having a length exceeding a length of the channel wherein each opposing end of the pair of opposing ends of the rod is exposed adjacent to a respective lateral side of the housing.

8. The projection system of claim 7, further comprising a pair of end caps being coupled to the rod, each end cap of the pair of end caps being positioned on a respective opposing end of the pair of opposing ends, each end cap of the pair of end caps comprising a high friction material wherein the pair of end caps are configured to inhibit the rod from being pivoted within the channel until pressure is applied to one of the rod and the panel.

9. The projection system of claim 1, further comprising a coupler releasably coupling the housing to the dashboard of the vehicle.

10. The projection system of claim 9, the coupler further comprising:

a first mating member being coupled to the housing, the first mating member being magnetic; and a second mating member being couplable to the dashboard, the second mating member being magnetic wherein the second mating member is magnetically attracted to the first mating member to releasably secure the housing on the dashboard.

11. The projection system of claim 10, wherein the first mating member is planar.

12. The projection system of claim 11, the second mating member further comprising:

a second mating member upper surface being planar wherein the second mating member upper surface is positionable flush against the first mating member; and a second mating member lower surface being adhesive wherein the second mating member lower surface adhesively engages the dashboard to secure the second mating member on the dashboard.

13. The projection system of claim 10, the first mating member further comprising a first mating member outer surface facing outwardly from the housing, the first mating member outer surface being concavely arcuate.

14. The projection system of claim 13, the second mating member further comprising:

a second mating member plate having a second mating member lower surface, said second mating member lower surface being adhesive wherein the second mating member lower surface adhesively engages the dashboard to secure the second mating member on the dashboard; and a second mating member dome being coupled to the second mating member plate, the second mating member dome being convexly arcuate wherein the second mating member dome has a curvature being complementary a curvature of the first mating member outer surface and wherein the first mating member outer surface is pivotable on the second mating member dome while the first mating member is coupled to the second mating member whereby the coupler facilitates the housing in being pivoted on the dashboard.

15. A projection system comprising:

a vehicle having a dashboard, a windshield, and an interior space, the windshield being positioned adjacent to the dashboard, the windshield having a windshield interior surface being positioned within the interior space wherein the windshield interior surface is configured to be visible to a user while the user is driving the vehicle;

a housing having a bottom wall, a top wall, and a peripheral wall being coupled to and extending between the bottom wall and the top wall, the bottom wall being planar wherein the bottom wall is removably positionable on an exterior surface the dashboard, the top wall being planar, the peripheral wall having a front side, a back side, and a pair of lateral sides;

a panel being pivotably coupled to the housing wherein the panel is pivotable toward and away from the top wall of the housing, the panel having a lower surface and an upper surface, the lower surface facing the top wall of the housing, the lower surface being planar wherein the lower surface is positionable flush against the top wall of the housing when the panel is fully pivoted toward the top wall of the housing, the upper surface being positionable to face the windshield interior surface of the windshield when the panel is pivoted away from the top wall of the housing, the panel having a lower edge being positioned proximate to a junction between the panel and the housing wherein the panel is pivotable about the lower edge;

a transceiver being positioned within the housing, the transceiver being configured to wirelessly communicate with a global positioning system wherein the transceiver is configured to identify a geographic location of the housing and wherein the transceiver is configured to receive a plurality of data points for the geographic location, the plurality of data points including a local speed limit, a local wind speed, a local wind gust speed, a local wind direction, and a local temperature;

a processor being positioned within the housing, the processor being electrically coupled to the transceiver;

a power source being positioned within the housing, the power source being electrically coupled to the processor;

a plurality of projectors being electrically coupled to the processor, the plurality of projectors being inset into the upper surface of the panel, the plurality of projectors being exposed within the upper surface of the panel wherein each projector of the plurality of projectors is configured to project a respective data point of the plurality of data points for the geographic location onto the windshield interior surface of the windshield while the bottom wall of the housing is positioned on the dashboard and while the panel is pivoted away from the top wall of the housing, the plurality of projectors including:

a speed projector being centered on the upper surface of the panel, the speed projector being configured to project the local speed limit onto the windshield interior surface wherein the local speed limit is configured to be visible to the user while the user is driving the vehicle;

a wind data projector being positioned proximate to the lower edge of the panel, the wind data projector being configured to project the local wind speed and the local wind gust speed onto the windshield interior surface wherein each of the local wind speed and the local wind gust speed is configured to be visible to the user while the user is driving the vehicle;

a wind direction projector being positioned adjacent to the wind data projector, the wind direction projector being configured to project the local wind direction onto the windshield interior surface wherein the local wind direction is configured to be visible to the user while the user is driving the vehicle; and a temperature projector being spaced from the wind direction projector, the temperature projector being positioned proximate to the lower edge of the panel, the temperature projector being configured to project the local temperature onto the windshield interior surface wherein the local temperature is configured to be visible to the user while the user is driving the vehicle;

a power switch being electrically coupled to the processor, the power switch being actuatable to signal the processor to actuate the plurality of projectors, the power switch being positioned on a first lateral side of the pair of lateral sides of the peripheral wall of the housing;

a power cord being electrically coupled to the power source wherein the power cord is configured to be removably positionable within an external power outlet to transfer power to the power source, the power cord extending outwardly from a second lateral side of the pair of lateral sides of the peripheral wall of the housing;

a cutout extending into the housing, the cutout being positioned on the back side of the peripheral wall of the housing;

a fin being coupled to the panel, the fin extending from the lower edge of the panel, the fin having a shape being complementary to a shape of the cutout wherein the fin is positioned within the cutout;

a channel extending through the back side of the peripheral wall of the housing and the fin;

a rod being positioned within the channel, the rod being pivotably coupled to the housing within the channel, the rod being statically coupled to the fin wherein the rod pivots the fin and the panel when the rod is pivoted within the channel, the rod having a pair of opposing ends, the rod having a length exceeding a length of the channel wherein each opposing end of the pair of opposing ends of the rod is exposed adjacent to a respective lateral side of the pair of lateral sides of the housing;

a pair of end caps being coupled to the rod, each end cap of the pair of end caps being positioned on a respective opposing end of the pair of opposing ends, each end cap of the pair of end caps comprising a high friction material wherein the pair of end caps are configured to inhibit the rod from being pivoted within the channel until pressure is applied to one of the rod and the panel; and a coupler releasably coupling the housing to the dashboard of the vehicle, the coupler including:

a first mating member being coupled to the bottom wall of the housing, the first mating member being centered on the bottom wall of the housing, the first mating member being magnetic; and a second mating member being couplable to the dashboard, the second mating member being magnetic wherein the second mating member is magnetically attracted to the first mating member to releasably secure the housing on the dashboard.

* * * * *